Figure 3:
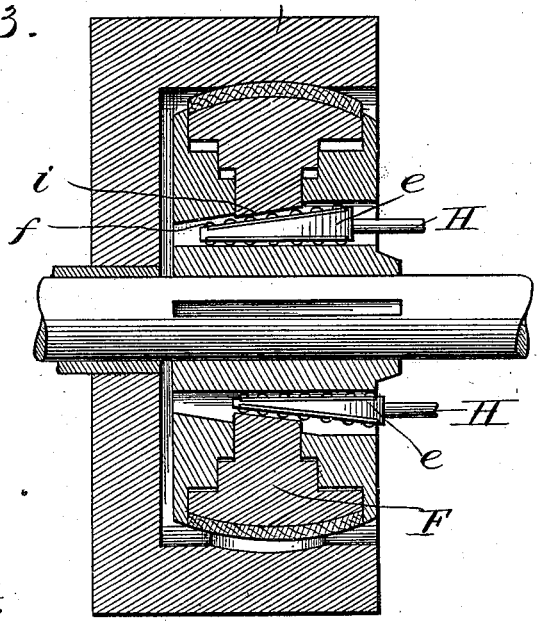

No. 695,407. Patented Mar. 11, 1902.
J. MacCALLUM, Jr.
CLUTCH.
(Application filed Nov. 1, 1901.)
(No Model.) 3 Sheets—Sheet 1.
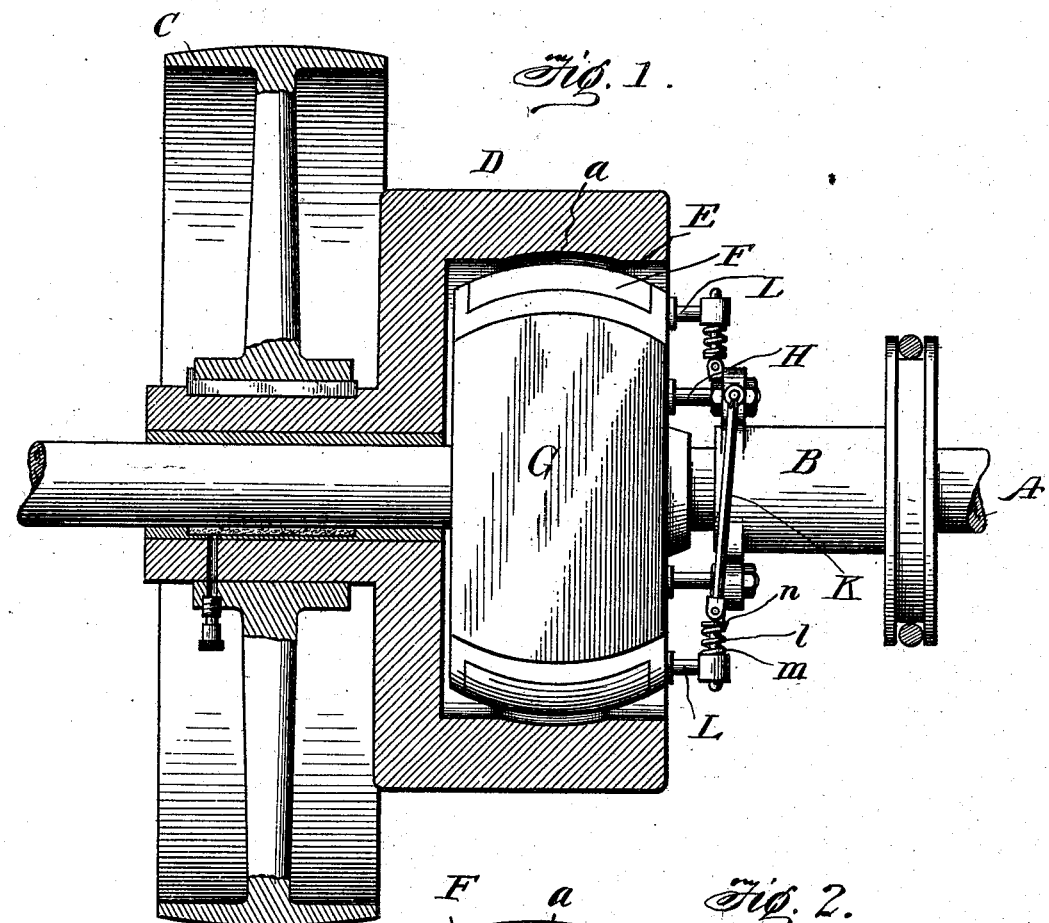
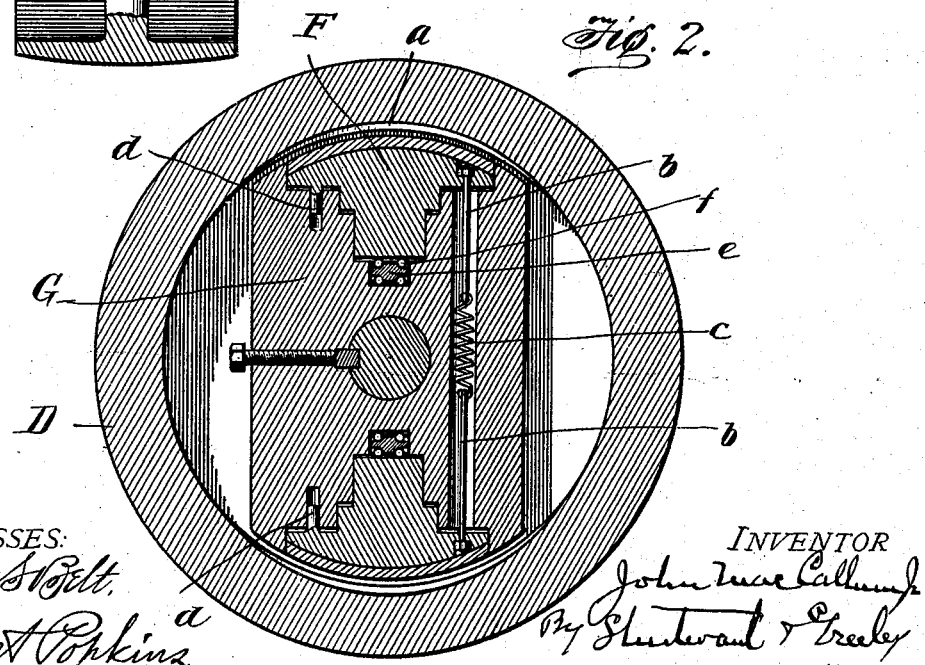

No. 695,407. Patented Mar. 11, 1902.
J. MacCALLUM, Jr.
CLUTCH.
(Application filed Nov. 1, 1901.)
(No Model.) 3 Sheets—Sheet 2.

WITNESSES:
Fenton S. Belt,
Albert Popkins

INVENTOR
John MacCallum Jr.
BY Sturtevant & Freeley
Attorneys

No. 695,407. Patented Mar. 11, 1902.
J. MacCALLUM, Jr.
CLUTCH.
(Application filed Nov. 1, 1901.)

(No Model.) 3 Sheets—Sheet 3.

Witnesses
Fenton S. Belt,
Grace P. Brereton.

Inventor
John MacCallum Jr.
by Sturtevant & Greeley
Attorneys

UNITED STATES PATENT OFFICE.

JOHN MacCALLUM, JR., OF WILKESBARRE, PENNSYLVANIA, ASSIGNOR OF TWO-THIRDS TO CHARLES B. DOUGHERTY AND WILLIAM SHARPE, OF WILKESBARRE, PENNSYLVANIA.

CLUTCH.

SPECIFICATION forming part of Letters Patent No. 695,407, dated March 11, 1902.

Application filed November 1, 1901. Serial No. 80,813. (No model.)

*To all whom it may concern:*

Be it known that I, JOHN MACCALLUM, Jr., a citizen of the United States, residing at Wilkesbarre, in the county of Luzerne, State of Pennsylvania, have invented certain new and useful Improvements in Clutches, of which the following is a description, reference being had to the accompanying drawings, and to the letters of reference marked thereon.

The invention relates to an improvement in clutch mechanism, and particularly to a combined friction and positive clutch whereby power is transmitted from a driving-shaft to a shaft to be driven.

The object of the invention is to provide a new and improved clutch which is simple and durable in construction and arranged in such a manner as to permit of gradually applying the friction-lock until the speed of the driving and driven shafts is equal, or nearly so, when the frictional action ceases and a positive locking takes place between the two parts, thus making a direct and positive coupling.

While it has heretofore been proposed to provide friction and positive mechanism in the same clutch, the friction-lock being first gradually applied, and then when the speed of the driving and driven parts becomes equal to break the friction-lock and apply the positive lock, still in all the devices of which I am aware the friction and positive locks are different devices, the frictional lock being actuated by the initial sliding of the shaft-sleeve and the positive lock being a separate mechanism, such as separate dogs and teeth which act when the frictional lock ceases.

The present invention presents certain advantages of simplicity and effectiveness over devices for this purpose heretofore devised, and perhaps its most distinguishing feature consists in making the frictional and positive locks identical. When the frictional action of the lock ceases, it automatically becomes a positive lock without the necessity of bringing any other set of mechanism into action.

Again, the invention consists in combining with the frictional and positive locking means a device operated by the sleeve, by which the action of forcing the frictional lock into operation is opposed to the action of a spring to prevent too sudden movement of the shoes into engagement with the wheel to be driven, while after the frictional locking is accomplished the further movement of the sleeve is aided by said device to accomplish quickly the positive locking.

Finally, the invention consists in various constructions and arrangements of parts, all as hereinafter described, and referred to in the appended claims.

The invention is illustrated in the accompanying drawings, in which—

Figure 4:
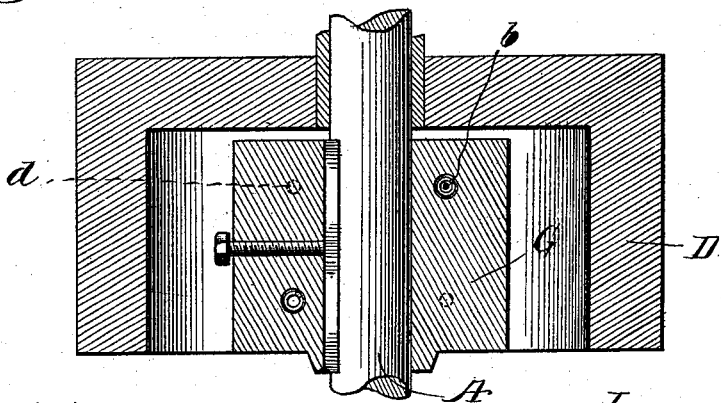
Figure 5:
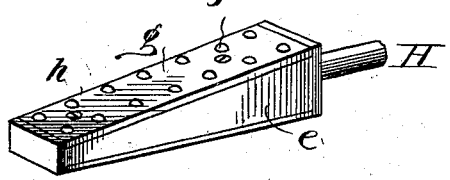
Figure 6:
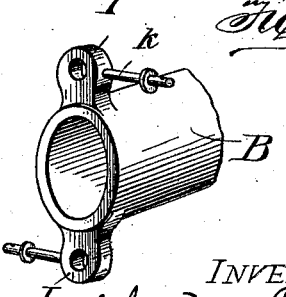
Figure 7:
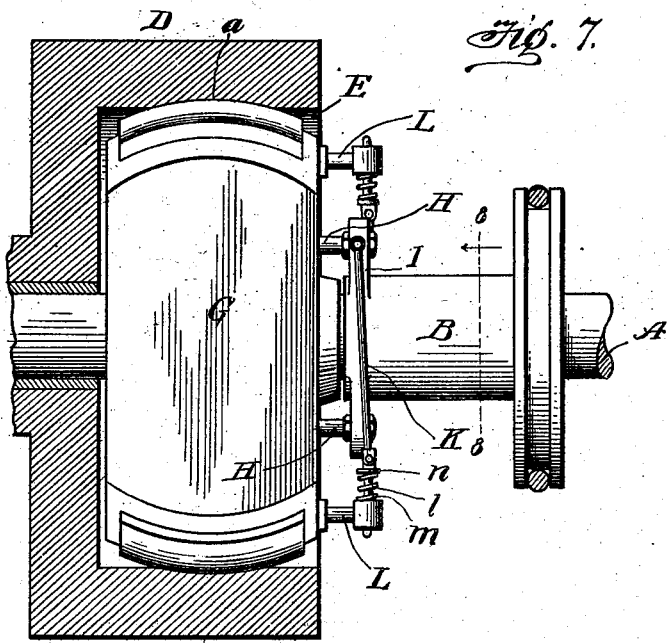
Figure 8:
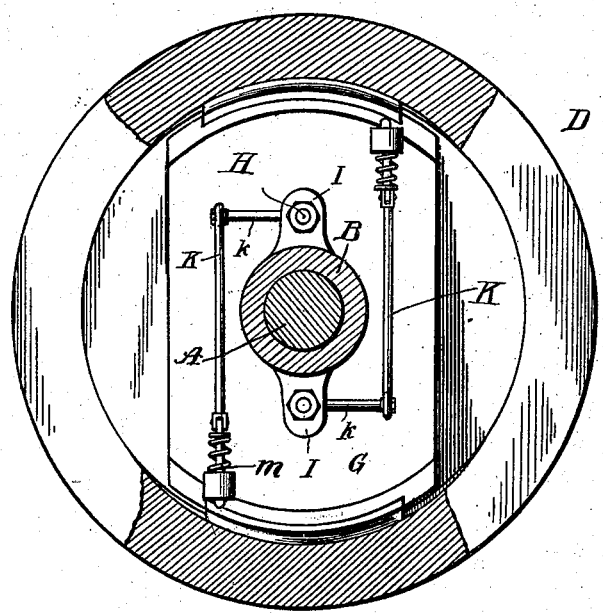

Figure 1 is a side elevation, partly in section, illustrating my clutch mechanism and its application to the transmission of power from a driving to a driven shaft or pulley. Fig. 2 is a vertical section on line 2 2 of Fig. 4. Fig. 3 is a vertical section on line 3 3 of Fig. 2. Fig. 4 is a section on line 4 4 of Fig. 2. Fig. 5 is a detail perspective view of one of the wedges. Fig. 6 is a detail perspective of a portion of the sliding sleeve, showing the two ears for operating the shoe-moving and positive locking mechanism. Fig. 7 is an end view of Fig. 1, showing the position of the rods K when the shoes are in engagement with the recesses; and Fig. 8 is a view, partly in section, on line 8 8 of Fig. 7, looking in the direction of the arrow.

In the drawings, A represents the driving-shaft, having the sliding sleeve B splined thereon and operated by a lever in the usual manner.

C is the pulley or wheel to be driven, having a spool D extending from the hub thereof. The inner rim E thereof is cut out, as shown at *a*, to form recesses in which may fit the outer surfaces of shoes F, supported on a shoe-carrier casting G, fixed on the shaft. The outer periphery of each recess *a* is eccentric with respect to the rim E, and each end of the recess merges gradually into the periphery of the inner rim E, as shown in the drawings. This inner rim E, therefore, may practically be said to be divided up into a number of concentric friction-surfaces having eccentric recesses.

The shoes F have their shanks formed to fit recesses in the carrier G, opposite shoes being united and normally held within their sockets by rods *b*, placed at diagonally opposite corners, united at their respective centers by springs *c*. The opposite inner edges of the shoes F are provided with dowel-pins *d*, fitting recesses in the carrier G, and by these and the rods radial movement is allowed the shoes, they being properly guided. To force outwardly the shoes into engagement with the inner rim of the spool, the sliding sleeve B is provided with rods H, to the inner ends of which are secured wedge-shaped hollow plates or blocks *e*, having balls *f* contained therein projecting through bearing perforations *g* in the upper plate *h*. The inner end of the shoe-shanks are beveled, as shown at *i*, to correspond with the wedge-shaped blocks *e*. As the sliding sleeve is moved along the shaft toward the left the antifriction-blocks *e* force outwardly the shoes against the inner rim of the spool and cause the same to rotate slowly at first, but gradually increasing until the frictional engagement gives way to a positive locking engagement at the time the shoes pass into the recesses *a*. To facilitate this positive locking at the time it is desired that the frictional engagement should cease and to prevent accidental displacement of the positive lock and also to prevent too-sudden locking of the parts, I have provided the following mechanism: Projecting transversely from the ears I on the sleeve B, on which the rods H are supported, are short rods *k*, to which are attached downwardly and upwardly inclined projecting rods K, at their opposite ends, respectively, being pivoted to a pin or rod *l*, attached to a boss L, projecting from the shoe-carrier G. Around the pin or rod *l* is a spring *m*, bearing at one end against the boss and at the other end against a washer *n*, engaging the end of the rod K. As the sleeve is moved toward the left the rods K are straightened, thus compressing the springs *m*, the sleeve thereupon being moved against the pressure of the spring. When, however, the rods pass beyond this perpendicular position, the springs tend to force the sleeve toward the left, thus causing the shoes to positively and quickly engage the recesses *a* and to be locked therein against the pressure of the springs, thus preventing any accidental displacement.

Having thus described my invention, what I claim as new, and desire to secure by Letters Patent, is—

1. In a clutch, the combination with movable shoes, a part to be driven, provided with concentric friction-surfaces and eccentric recesses to be engaged by said shoes, and means for positively moving said shoes to cause them to engage the frictional surface of the part to be driven, and finally to positively enter said recesses; substantially as described.

2. In a clutch, the combination with movable shoes and a part to be driven, provided with recesses whose inner periphery is continuous and eccentric to the inner periphery of the part to be driven, means for positively operating said shoes to cause them to frictionally engage the inner periphery of the part to be driven outside the recess, and finally to enter said recesses; substantially as described.

3. In a clutch, the combination with movable combined frictional and positive locking members, of a part to be driven having recesses; the outer periphery of each recess being eccentric to the inner periphery of the part to be driven, but formed on a continuous curve without teeth, and means for moving said frictional and positive locking members into engagement, first with the inner periphery of the part to be driven outside the recesses, and finally into the recesses; substantially as described.

4. In a clutch, the combination with radially-movable shoes with a spring connection between the same normally acting to keep them depressed, a part to be driven, having eccentric oppositely-placed recesses and concentric friction-surfaces, means for positively moving the shoes radially against the pressure of the retaining-spring, first into frictional engagement with the part to be driven outside the recesses, and finally into engagement with said recesses; substantially as described.

5. In a clutch, the combination with movable combined frictional and positive locking members, of a part to be driven, provided with recesses and having a frictional surface extending between the recesses, means for positively operating said locking members, to cause them first to engage the friction-surface of the part to be driven, and auxiliary means acting upon said locking members in conjunction with the positive means for causing said locking members to engage the recesses; substantially as described.

6. In a clutch, the combination with movable combined frictional and positive locking members, of a sliding sleeve provided with mechanism for moving said members, and auxiliary means coöperating therewith to cause said members to positively engage the part to be driven; substantially as described.

7. In a clutch, in combination with the part to be driven, having frictional bearing-surfaces, and eccentric recesses adjacent the same, of movable shoes with means for operating them to cause them first to engage the frictional surfaces, and then the recesses; substantially as described.

8. In a clutch, in combination with the part to be driven, having frictional bearing-surfaces, and recesses adjacent the same, of movable shoes, with positive means for operating them to cause them first to engage the frictional surfaces, and automatic auxiliary means to cause them to positively engage the recesses; substantially as described.

9. In a clutch, in combination with a part to be driven, movable shoes, and a sliding sleeve, with connections between the sleeve and the shoes for positively operating the same, means for retarding the action of the operating means to prevent shock, and auxiliary means operable when the sleeve has reached a predetermined point in its movement, to cause the shoes to positively lock the driven part; substantially as described.

10. In a clutch, in combination with the sliding shoes, means for positively forcing them outwardly operated by a sliding sleeve, a toggle-lever and spring device for resisting the first movement of said sliding sleeve, whereby a slow progressive frictional locking takes place, and for aiding in the final forcing outward of the shoes, whereby a quick positive locking takes place; substantially as described.

11. In combination with the shoes, anti-friction wedges for forcing the same outwardly, and a lever and spring connection between the shoe-carrier, and the sliding sleeve, whereby said spring acts first against the movement of the sleeve to cause the shoes to be pressed outwardly gradually, but whereby when the levers have passed over the center, the sleeve is drawn quickly along the shaft to cause a rapid final positive engagement of the shoes with the part to be driven; substantially as described.

In testimony whereof I affix my signature in presence of two witnesses.

JOHN MacCALLUM, JR.

Witnesses:
C. L. STURTEVANT,
GRAFTON L. McGILL.